US006737461B2

(12) United States Patent
Hannay et al.

(10) Patent No.: US 6,737,461 B2
(45) Date of Patent: May 18, 2004

(54) ARTICLES FOR DYNAMIC LOAD APPLICATIONS

(75) Inventors: Judy Hannay, Sarnia (CA); Harald Bender, Pulheim (DE)

(73) Assignee: Bayer Inc., Sarnia (CA)

( * ) Notice: Subject to any disclaimer, the term of this patent is extended or adjusted under 35 U.S.C. 154(b) by 124 days.

(21) Appl. No.: 10/083,444

(22) Filed: Feb. 26, 2002

(65) Prior Publication Data

US 2002/0161086 A1 Oct. 31, 2002

(30) Foreign Application Priority Data

Feb. 28, 2001 (CA) .............................................. 2338900

(51) Int. Cl.⁷ ............................. C08K 5/04; C08K 5/09; C08K 3/34; C08K 3/26
(52) U.S. Cl. ...................... 524/397; 524/426; 524/427; 524/451; 474/191; 474/264; 474/271
(58) Field of Search ................................ 524/397, 426, 524/427, 451; 474/191, 264, 271

(56) References Cited

U.S. PATENT DOCUMENTS 5,610,217 A * 3/1997 Yarnell ....................... 524/397
5,698,650 A 12/1997 Jourdain et al. ............. 526/293
5,783,640 A 7/1998 Sandstrom et al. ....... 525/329.3

FOREIGN PATENT DOCUMENTS

| CA | 2281274 | 2/2001 |
| EP | 0 605 843 | 3/1999 |
| EP | 0 940 429 | 9/1999 |
| EP | 1 081 188 | 3/2001 |
| WO | 97/22662 | 6/1997 |
| WO | 97/22663 | 6/1997 |

* cited by examiner

*Primary Examiner*—Kriellion A. Sanders
(74) *Attorney, Agent, or Firm*—Joseph C. Gil; Jennifer R. Seng; Noland J. Cheung

(57) ABSTRACT

A vulcanizate derived from a polymer composition comprising three components exhibits improved hot air aging properties and is useful, for example, for the manufacture of articles subject to dynamic loading, such as belting applications. The first component is a polymer having a main polymer chain derived from: (i) at least about 30% by weight of a first monomer which introduces at least one of a secondary carbon and a tertiary carbon to the backbone, and (ii) from 0 to about 70% by weight of at least one other monomer. Preferred are ethylene-alpha-olefin copolymers. The second component is a salt of a strong base and a weak acid, the salt comprising a metal selected from Group I of the Periodic Table of Elements. The third component is an antioxidant.

9 Claims, No Drawings

ARTICLES FOR DYNAMIC LOAD APPLICATIONS

FIELD OF THE INVENTION

This invention is related to articles which are to be subjected to dynamic loading. Examples of such applications include belts, including accessory drive and power transmission belts, as well as flat belts and other shaped articles useful in dynamic applications, such as vehicle brake parts and engine mounts, for example. More particularly, the invention relates to belting and other shaped articles useful in dynamic applications whose compositions exhibit superior heat aging properties.

BACKGROUND OF THE INVENTION

Polychloroprene rubber (CR) has been the most popular material of choice for the manufacture of power transmission belts for the past half century, due to its unique combination of properties, namely oil resistance; toughness; dynamic flex life; good adhesion to other materials and heat resistance up to 100° C. In the past, CR belt technology has kept pace with the needs of the automotive industry but, in recent years, the combination of decreased vehicle size and more aerodynamic design has resulted in smaller engine compartments. This has resulted in higher under-the-hood temperatures (>150° C.), placing additional stresses on parts in the engine compartment. Thus, the need for new materials having improved heat and ozone resistance for belting applications has emerged.

New materials such as alkylated chorosulfonated polyethylene and hydrogenated acrylonitrile rubber have been introduced, but these polymers bring significant increase in the cost of a belt.

The use of blends of ethylene-propylene copolymer (EPM), ethylene-propylene non-conjugated diene terpolymer (EPDM), ethylene vinyl acetate copolymer (EVM) or ethylene acrylate copolymer (EAM) with other elastomers exhibiting more favorable mechanical properties has also been explored for use in dynamic applications, such elastomers including polychloroprene, nitrile-diene rubbers, organopolysiloxane resins and poly ethyl vinyl acetate. In such cases, the EPM, EPDM, EVM or EAM is added to improve the ozone- or oxygen-resistance of the composition, or in order to reduce the cost thereof. The amount of ethylene polymer added, however, has been estimated to be limited to less than about 40% by weight of the final elastomeric composition in order to maintain satisfactory mechanical properties.

U.S. Pat. No. 5,610,217 (the '217 patent) reports that ethylene-propylene non-conjugated diene terpolymer (EPDM) and ethylene vinyl acetate (EVM) elastomers could serve as the primary elastomer in polymer compositions for belting. The '217 patent further discloses that using a metal salt of an alpha-beta-unsaturated organic acid (in amounts of about 1–30 phr) helps maintain abrasion and pilling resistance, tensile strength, cut-growth resistance, modulus and adhesion to reinforcement materials under high and low temperature dynamic loading.

European Patent Application EP 0 605 843 A1 claims the use of zinc diacrylate (at a level of about 5–35 phr) in an ethylene-vinyl acetate composition, or in a blend with ethylene alpha olefin polymer.

European Patent Application EP 0 940 429 A1 discloses a vulcanizate having improved hot-air aging characteristics. The composition comprises a nitrile polymer; a filler; an additive and a vulcanization system. The additive may be a strong base, a salt of a strong base and a weak acid, a salt of a weak acid, a polycarbodiimide, or mixtures thereof.

Bayer's unpublished Canadian patent application 2,281,274 (the disclosure of which is hereby incorporated by reference) discloses that compositions comprising a polymer, such as an ethylene-alpha-olefin polymer, and a Group I metal salt of a strong base and a weak acid have improved hot-air aging characteristics.

SUMMARY OF THE INVENTION

We have found that compositions comprising an elastomer having a main polymer chain derived from: (i) at least about 30% by weight of a first monomer which introduces at least one of a secondary carbon and a tertiary carbon to the main polymer chain, and (ii) from 0 to about 70% by weight of at least one other monomer, a Group I metal salt of a strong base and a weak acid, and an antioxidant have excellent hot-air aging characteristics, and so are useful for the manufacture of articles to be subjected to dynamic loading, such as power transmission belts, shaft seals, rubber roll covers and vehicle brake parts, as well as applications such as engine mounts and pulley torsion dampeners. It is also envisaged that such compositions would be useful for hose applications, particularly in non-aqueous environments where the improved properties would be of benefit.

DESCRIPTION OF THE INVENTION

The first component of the present polymer composition is a polymer having a main polymer chain derived from: (i) at least about 30% by weight of a first monomer which introduces at least one of a secondary carbon and a tertiary carbon to the main polymer chain, and (ii) from 0 to about 70% by weight of at least one other monomer.

As used throughout this specification, the term "polymer" is intended to have a broad meaning and is meant to encompass any polymer having a main polymer chain which comprises at least one secondary or tertiary carbon. Those of skill in the art will understand that a secondary carbon is a carbon atom having two hydrogen atoms bonded to it while a tertiary carbon is a carbon atom having one hydrogen atom bonded to it. The polymer may be a homopolymer, a copolymer, a terpolymer and the like. Also, it is possible to use a mixture of polymers provided at least one polymer in the mixture has the polymer main chain properties described above.

The polymer suitable for use herein may be an elastomer (e.g., a hydrocarbon rubber), a graft polymer or block polymer of monomers having at least one ethylenically unsaturated bond and polymerizable through this unsaturation, and the like.

Elastomers are well known to those of skill in the art. Non-limiting examples of suitable elastomers may be selected from the group comprising natural rubber (NR), cis-1,4-polyisoprene rubber (IR), polybutadiene rubber (BR), styrene-butadiene rubber (SBR), acrylonitrile-butadiene rubber (NBR), hydrogenated acrylonitrile-butadiene rubber (HNBR), other HNBR copolymers, HNBR terpolymers (including hydrogenated acrylonitrile, butadiene, unsaturated carboxylic acid ester terpolymers), ethylene-propylene monomer rubber (EPM), ethylene-propylene-diene monomer rubber (EPDM), ethylene-vinyl acetate rubber (EVM) and the like.

Of course, subject to compatibility, mixtures of two or more of any of the foregoing polymers may be used herein.

Preferably, the polymer used in the present polymer composition is an elastomer. More preferably, it is an ethylene-alpha-olefin-based elastomer such as an ethylene-propylene copolymer (e.g. EPM), an ethylene-propylene non-conjugated diene terpolymer (e.g. EPDM), an ethylene-vinyl acetate copolymer (e.g. EVM) or an ethylene acrylate copolymer (e.g. EAM). Further examples of such polymers include, but are not limited to, copolymers of ethylene with conjugated dienes such as 1,3-Butadiene, Isoprene, 1,3-Pentadiene, as well as non-conjugated dienes such as 1,4-Hexadiene, 1,5-Heptadiene, 5,7-Dimethyl-1,6-octadiene, 7-Methyl-1,6-octadiene, 4-Vinyl-1-cyclohexene, 5-Ethylidene-2-norbornene, 5-Vinyl-2-norbornene and Dicyclopentadiene. Preferably, the ethylene-containing polymer has from about 10% to about 90% ethylene, or in the case of EPDM, up to about 20% 5-ethylidene-2-norbornene.

The second component of the present polymer composition is a Group I metal salt of a strong base and a weak acid. Non-limiting examples of the weak acids useful in the production of the above-mentioned salt may be selected from the group comprising carbonic acid, $C_1$–$C_{50}$ fatty acids, ethylene diamine tetra(acetic acid), phosphoric acid and mixtures thereof. The preferred salt for use in the present polymer composition may be selected from the group comprising sodium carbonate, potassium carbonate, sodium stearate, potassium stearate and mixtures thereof. The most preferred salt for use in the present polymer composition is sodium carbonate. Preferably, the salt is present in the polymer composition in an amount in the range of from about 0.5 to about 50 parts by weight, preferably in the range of from about 1 to about 20 parts by weight, most preferably in the range of from about 2.5 to about 7.5 parts by weight.

The present polymer composition further comprises an antioxidant. Non-limiting examples of useful antioxidant compounds may be selected from the group comprising alkylated diphenylamines (such as styrenated diphenylamine and the like), quinoline-type stabilizers (such as 2,2,4-trimethyl-1,2-dihydroquinoline polymer and the like), mercaptobenzimidazoles (such as zinc salts of methylmercaptobenzimidale) and the like. With sulfur-containing vulcanization systems, phenylene diamine derivatives (such as N-phenyl-N'-isopropyl-p-phenylene diamine and the like), as well as sterically hindered phenols (such as butylated hydroxytoluene and the like) can also be used. The antioxidant is present in the polymer composition in an amount in the range of from about 0.01 to about 10 parts by weight, preferably in the range of from about 0.01 to about 5 parts by weight and, more preferably in the range of from about 0.03 to about 3 parts by weight.

Preferred antioxidants are alkylated diphenylamines, phenylene diamine derivatives and sterically-hindered diphenols.

Without wishing to be bound by any particular theory, it is thought that the salt and the antioxidant react together to form an adduct which is converted back into the "parent" antioxidant over time, and that this gradual conversion to, or release of, parent antioxidant, is responsible, at least in part, for the improved properties seen in these compositions. This is borne out by the observation that, whilst the salt and the antioxidant on their own can have beneficial effects on the hot-air ageing properties of compositions containing them, the effect of using both in a composition is synergistic; that is, the improvement seen is not simply the sum of the individual improvements. The term "adduct" as used herein refers to the product resulting from the interaction of the salt and the antioxidant components of the compositions described herein. The chemical nature of the adduct will depend upon the nature of the interaction between the two components; for example it may be a discrete compound, a co-ordination species or other chemical complex.

Preferably, the present polymer composition further comprises a vulcanization system. The choice and amount of vulcanization system depends on a number of factors, including the choice of polymer component, the intended application of the vulcanizate and the like. Preferably, the vulcanization system is selected from the group comprising sulfur, a sulfur-donor cure system and a peroxide compound.

Non-limiting examples of useful sulfur donor cure systems may be selected from the group comprising thiuram compounds (such as tetramethyl thiuram disulfide, tetraethyl thiuram disulfide, tetramethyl thiuram monosulfide and the like), and morpholine compounds (such as morpholine disulfide and the like). Further, it is possible to use dithiobis (caprolactam) in a sulfur donor cure system. The useful amount of sulfur or the sulfur-donating compound preferably is in the range of from about 0.1 to about 5 parts by weight.

As is known in the art, when the vulcanization agent is sulfur or a sulfur donor cure system, it is conventional to include a vulcanization accelerator. Non-limiting examples of useful vulcanization accelerators may be selected from the group comprising thiazole compounds (such as 2-mercaptobenzothiazole [MBT], dithiobis mercaptobenzothiazole [MBTS] and the like), sulfenamide compounds (such as N-cyclohexyl-2-benzothiazyl sulfenamide and the like), dithio-carbamates (such as zinc-dibutyl dithiocarbamate) and mixtures thereof. Such vulcanization accelerators are preferably used in an amount in the range of 0.5 to 5 parts by weight. Further, it is known to use metal oxides such as zinc oxide, magnesium oxide and the like, as well as acids such as stearic acid, cure activators in these vulcanization systems.

As stated above, the vulcanization system may comprise a peroxide compound, preferably an organic peroxide. Non-limiting examples of useful organic peroxide compounds may be selected from the group comprising dicumyl peroxide, benzoyl peroxide, 2,5-dimethyl-2,5-di(t-butylperoxy)-hexane, 2,2'-bis(tert-butylperoxydiisopropyl benzene, t-butyl peroxybenzoate and the like. Other useful peroxide compounds will be immediately apparent to those of skill in the art. The organic peroxide used is preferably in the range of from about 0.5 to about 15 parts by weight, preferably in the range of from about 2 to about 8 parts by weight.

When the vulcanization system comprises an organic peroxide, it is known to include a co-agent together therewith. Preferably, the co-agent acts as a polyfunctional monomer. Non-limiting examples of suitable such co-agents may be selected from the group comprising salts of α,β-unsaturated organic acids (such as zinc diacrylate and zinc dimethacrylate) triallyl cyanurate, triallyl isocyanurate, trimethylolpropane trimethacrylate, ethylene dimethacrylate, tolylene bismaleimide and the like. Preferably, the co-agent is used in an amount in the range of from about 1 to about 10 parts by weight.

Optionally, the present polymer composition further comprises a filler. The nature of the filler is not particularly restricted and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes), calcium carbonate, talc (magnesium silicate) and the like. The amount of filler is conventional. Preferably, the filler is present in an amount in the range of from about 20 to about 200 parts by weight per hundred parts by weight of the polymer. More preferably, the filler is present in an amount in the range of from about 20 to about 100 parts by weight per hundred parts by weight of the polymer. Most preferably, the filler is present in an amount in the range of from about 40 to about 80 parts by weight per hundred parts by weight of the polymer.

Preferably, the composition may further contain a compound which can act as a buffer (that is, in this case, an alkaline sink, or proton sponge). Preferably, such a compound has a $pk_a$ of at least about 9.0, more preferably at least about 10.0, most preferably in the range of from about 10.0 to about 14.0. Non-limiting examples of such compounds include, but are not limited to, calcium oxide, magnesium oxide, salts of carbonic acid, phosphonic acid, boric acid, $C_1$–$C_{30}$ fatty acids and the like.

In the present process, the polymer, the filler (as noted above, the use of a filler is optional), the additive and the vulcanization system may be admixed in any conventional manner known in the art. For example, this polymer composition may be admixed on a two-roll rubber mill or an internal mixer.

Thus, the polymer composition is mixed in a conventional manner and the temperature thereof during mixing is maintained as is known in the art.

In the present process, it is preferred to heat the polymer composition to form vulcanizates using conventional procedures well known in the art. Preferably, the polymer composition is heated to a temperature in the range of from about 130° C. to about 200° C., preferably from about 140° C. to about 190° C., more preferably from about 150° C. to about 180° C.

Preferably, the heating is conducted for a period of from about 1 minute to about 15 hours, more preferably from about 5 minutes to about 30 minutes. Various methods of post cure, as is well known in the art, may be used to complete the vulcanization step.

Other conventional compounding ingredients may also be included by mixing with the copolymer in the conventional manner. Such other compounding ingredients are used for their conventional purposes and include activators such as zinc oxide and magnesium oxide; stearic acid; plasticizers; processing aids; reinforcing agents; promoters and retardants in amounts well known in the art.

During production of the vulcanizate from the polymer composition, the vulcanizate may be formed into a reinforced composite with, for example, polyester fibre, nylon fibre, aramid fibre, glass fibre, carbon fibre, steel fibre cords or fabrics and the like, whereby a desired rubber composite product is obtained.

The choice of additional compounding ingredients and/or composite materials is governed by the application for which the compound thus-made is intended, and is within the purview of one skilled in the art.

Power transmission belts which form embodiments of the present invention include, but are not limited to, V-belts, toothed belts, short-fibre-reinforced belts and fabric-reinforced belts and the like. Flat belts, including fabric-reinforced flat belts, also form embodiments of the invention. Examples of such applications are found in U.S. Pat. No. 5,610,217 and PCT applications WO9722662 and WO9722663.

Brake parts which form embodiments of the present invention include, but are not limited to, coupling disks, sealing gaskets, valve seats, tubing, o-rings and the like. Examples of such applications are found in U.S. Pat. No. 5,698,650.

Embodiments of the present invention will be illustrated with reference to the following Examples, which are provided for illustrative purposes only, and should not be used to limit the scope of the invention. Unless otherwise stated, all parts in the Examples are parts by weight, and the term "phr" indicates parts per hundred parts rubber.

EXAMPLES

The materials used in the Examples include the following:

Buna™ EP T 2450: a terpolymer of ethylene, propylene and 5-ethylidene-2-norbornene, commercially available from Bayer Inc.;

Buna™ EP T 2370: a terpolymer of ethylene, propylene and 5-ethylidene-2-norbornene, commercially available from Bayer Inc.;

Carbon black, N550 Sterling SO: filler;

Naugard™ 445: antioxidant (4,4'-bis($\alpha$,-dimethylbenzyl) diphenylamine) commercially available from UniRoyal Chemicals;

Vulkanox™ ZMB-2/C5: antioxidant (zinc salt of 4 and 5-methyl-mercapto benzimidazole) commercially available from Bayer Inc.;

Vulkanox™ BKF: antioxidant (2,2'-methylene-bis-(4-methyl-6-tert-butyl phenol)) commercially available from Bayer Inc.;

Sunpar™ 2280: paraffinic oil commercially available from Sun Refining;

Sartomer™ 634: zinc dimethacrylate commercially available from The Sartomer Co.

Rhenofit™ TRIM/S: crosslinking activator for peroxide cures (70% trimethylpropane trimethacrylate and 30% silica) commercially available from Rhein Chemie.

Dynamar™ RC-5251Q: sodium carbonate commercially available from Dyneon;

Sodium Stearate T-1: sodium stearate commercially available from Witco Corp.

Vulcup™ 40 KE: peroxide (2,'2-bis(tert-butylperoxy diisopropyl)benzene) commercially available from Hercules.

Examples: 1–6

The following procedure was used for each of Examples 1–6. The polymer compositions used in these Examples are shown in Table 1.

The polymer composition of Examples 2, 4 and 6 contain ethylene $\alpha$-olefin polymer, carbon black, paraffinic oil, antioxidant and a peroxide. Examples 1, 3 and 5 are provided for comparison purposes only, and are outside the scope of the present invention. Examples 1 and 2 relate to a vulcanizate derived using carbon black, a paraffinic oil, antioxidant and a peroxide cure system. Examples 3 and 4 relate to a vulcanizate derived using a metal salt of an $\alpha$-$\beta$-unsaturated organic acid and Examples 5 and 6 relate to a vulcanizate derived using the peroxide crosslinking agent trimethylolpropane trimethacrylate.

The components of the polymer composition were mixed in a Banbury mixer using conventional techniques. The polymer composition was vulcanized at 170° C. for a period of 22, 22, 22, 24, 21 and 22 minutes, respectively, for Examples 1–6 in Table 1.

The elongation at break of the vulcanizate was determined in accordance with ASTM D 573. Hardness properties were determined using a Type A Shore durometer in accordance with ASTM D2240. The properties of the vulcanizates of Examples 1–6 are reported in Table 2.

The properties of the vulcanizates reported in Table 2 clearly illustrate the superiority of the hot air aging characteristics of the vulcanizates of Examples 2, 4 and 6 when compared to Example 1, 3 and 5. This translates into significant practical advantages in applications such as belting applications having increased high temperature demands.

TABLE 1

| Example | 1 | 2 | 3 | 4 | 5 | 6 |
|---|---|---|---|---|---|---|
| BUNA ™ EP T 2370 | 100 | 100 | | | | |
| BUNA ™ EP T 2450 | | | 100 | 100 | 100 | 100 |
| CARBON BLACK, N 550 | 60 | 60 | 60 | 60 | 60 | 60 |
| STERLING SO | | | | | | |
| SUNPAR ™ 2280 | 10 | 10 | 10 | 10 | 10 | 10 |
| SARTOMER ™ 634 | | | 10 | 10 | | |
| RHENOFIT ™ TRIM/S | | | | | 5 | 5 |
| DYNAMAR ™ RC-5251Q | | 3.2 | | 3.2 | | 3.2 |
| SODIUM STEARATE T-1 | | 0.6 | | 0.6 | | 0.6 |
| VULKANOX ™ ZMB-2/C5 (ZMMBI) | 0.4 | 0.4 | 0.4 | 0.4 | 0.4 | 0.4 |
| NAUGARD ™ 445 | 0.8 | 0.8 | 0.8 | 0.8 | 0.8 | 0.8 |
| VULKANOX ™ BKF (BPH) | | | | 0.4 | | 0.4 |
| VULCUP ™ 40KE | 5 | 5 | 5 | 5 | 5 | 5 |

TABLE 2

Aged Hot Air 336 hrs @160° C.

| Example | 1 | 2 | 3 | 4 | 5 | 6 |
|---|---|---|---|---|---|---|
| Hardness Shore A2 (pts.) | 92 | 83 | 76 | 76 | 89 | 76 |
| Ultimate Tensile (MPa) | 6.75 | 12.23 | 6.55 | 12.37 | 6.53 | 10.93 |
| Ultimate Elongation (%) | <01 | 188 | 56 | 188 | 1 | 140 |
| Stress @ 25 (MPa) | | 3.79 | 2.69 | 2.24 | | 2.17 |
| Stress @ 50 (MPa) | | 4.77 | 5.68 | 3.5 | | 3.61 |
| Stress @ 100 (MPa) | | 7.3 | | 6.8 | | 7.47 |
| Stress @ 200 (MPa) | | | | | | |
| Stress @ 300 (MPa) | | | | | | |
| Chg. Hard. Shore A2 (pts.) | 18 | 2 | 6 | 5 | 21 | 8 |
| Chg. Ulti. Tens. (%) | −67 | −40 | −66 | −30 | −63 | −31 |
| Chg. Ulti. Elong. (%) | | −43 | −84 | −51 | −100 | −53 |
| Change Stress @ 25 (%) | | 36 | 91 | 70 | | 67 |
| Change Stress @ 50 (%) | | 38 | 174 | 86 | | 89 |
| Change Stress @ 100 (%) | | 31 | | 93 | | 100 |
| Change Stress @ 200 (%) | | | | | | |
| Change Stress @ 300 (%) | | | | | | |

The publications, patents and/or patent applications referred to in this specification are incorporated by reference in their entirety to the same extent as if each individual publication, patent of patent application was specifically and individually indicated to be incorporated by reference in its entirety.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An article subjected to dynamic loading which comprises:

(i) a polymer having a main polymer chain derived from:
        (i) at least about 30% by weight of a first monomer which introduces at least one of a secondary carbon and a tertiary carbon to the main polymer chain, and (ii) from 0 to about 70% by weight of at least one other monomer,
    (ii) a salt of a strong base and a weak acid, the salt comprising a metal selected from Group I of the Periodic Table of Elements, and
    (iii) an antioxidant, wherein the salt is selected from the group consisting of sodium carbonate, sodium-stearate, a metal salt of carbonic acid, EDTA, phosphoric acid and mixtures thereof.

2. An article according to claim 1 wherein the polymer is an ethylene-alpha-olefin-based elastomer.

3. An article according to claim 1 wherein the antioxidant is selected from the group consisting of hindered phenols, diphenylamines, phenylene diamines and mixtures thereof.

4. An article according to claim 1, wherein the salt is present in an amount in the range from about 0.5 to about 50 parts by weight.

5. An article according to claim 4, wherein the salt is present in an amount in the range from about 1 to about 20 parts by weight.

6. An article according to claim 1 further comprising a buffer, the buffer being a compound which can act as a proton sink.

7. An article according to claim 1, further comprising a vulcanization system.

8. An article according to claim 7, wherein the vulcanization system is selected from the group comprising sulfur, a sulfur donor cure system and a peroxide compound.

9. An article according to claim 1 which is intended for use as a belt in the form of a power transmission belt selected from the group consisting of synchronous belts, V-belts, multi-V-ribbed belts and toothed belts.

* * * * *